US006414960B1

(12) United States Patent
Kuhn et al.

(10) Patent No.: US 6,414,960 B1
(45) Date of Patent: Jul. 2, 2002

(54) APPARATUS AND METHOD OF IN-SERVICE AUDIO/VIDEO SYNCHRONIZATION TESTING

(75) Inventors: Karl J. Kuhn, Haymarket; John Mark Zetts, Falls Church, both of VA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/221,868

(22) Filed: Dec. 29, 1998

(51) Int. Cl.$^7$ .......................... H04L 12/56; H04N 17/00
(52) U.S. Cl. .................... 370/395.64; 370/516; 348/181
(58) Field of Search .............................. 370/395.1, 252, 370/395.62, 395.64, 395.6, 389, 503, 516; 375/240.01, 240.27, 240.28; 348/180, 181, 470, 473, 474, 476–9

(56) References Cited

U.S. PATENT DOCUMENTS

| | | |
|---|---|---|
| 4,313,135 A | 1/1982 | Cooper |
| 4,780,755 A | 10/1988 | Knierim |
| 4,963,967 A | 10/1990 | Orland et al. |
| 4,969,041 A | 11/1990 | O'Grady |
| RE33,535 E | 2/1991 | Cooper |
| 5,040,081 A | 8/1991 | McCutchen |
| 5,243,424 A | 9/1993 | Emmett |
| 5,274,446 A | 12/1993 | Ashida |
| 5,327,237 A | 7/1994 | Gerdes et al. |
| 5,446,492 A | 8/1995 | Wolf et al. |
| 5,506,832 A | 4/1996 | Arshi et al. |
| 5,555,364 A | 9/1996 | Goldstein |
| 5,557,333 A | 9/1996 | Jungo |
| 5,559,559 A | 9/1996 | Jungo et al. |
| 5,572,247 A | 11/1996 | Montgomery |
| 5,572,261 A | 11/1996 | Cooper |
| 5,574,500 A | 11/1996 | Hamada et al. |
| 5,585,858 A | 12/1996 | Harper |
| 5,587,743 A | 12/1996 | Montgomery |
| 5,596,364 A | 1/1997 | Wolf et al. |
| 5,617,148 A | 4/1997 | Montgomery |
| 5,654,751 A | 8/1997 | Richard, III |
| 5,663,766 A | 9/1997 | Sizer |
| 6,275,428 B1 * | 8/2001 | Fukuda et al. .............. 365/201 |
| 6,297,845 B1 * | 10/2001 | Kuhn et al. .................. 348/192 |
| 6,298,465 B1 * | 10/2001 | Klotchkov ................... 714/814 |

FOREIGN PATENT DOCUMENTS

FR      2694674      11/1994

\* cited by examiner

Primary Examiner—David R. Vincent
(74) Attorney, Agent, or Firm—Joseph C. Redmond, Jr., Esq.; Morgan & Finnegan, LLP; Richard A. Tomlin, Esq.

(57) ABSTRACT

An apparatus and method provide non-intrusive in-service testing of audio/video synchronization testing without using traditional audio marker tones. The network includes an A/V synchronous test signal generator which injects video and audio markers into the video and audio non-intrusively and routes the two signals into a switch where they are switched into a channel for encoding and transmission via the ATM network. At the distant end the signal is decoded and routed by a switch into the A/V test generator and measurement set where the markers are detected and the A/V skew calculated, after which the audio and video are routed to the subscriber. The A/V test set signal generator includes a Video Blanking Interval (VBI) test signal generator and a white noise generator, the former injecting a marker into the video signal and the later injecting an audio marker into the audio signal. The video marker is injected into the VBI and broadband, background audio noise to measure the delay between the audio and video components of a broadcast. The marking of the audio is accomplished by gradually injecting white noise into the audio channel until the noise level is 6 dB above the noise floor of the audio receiver. As a precursor A/V sync signal, a small spectrum of the white noise is notched or removed. This signature precludes inadvertent recognition of program audio noise as the audio marker.

14 Claims, 14 Drawing Sheets

Measure Ambient Program Audio Noise Floor

Video Marker Monitor

APPARATUS AND METHOD OF IN-SERVICE AUDIO/VIDEO SYNCHRONIZATION TESTING

CROSS RELATED APPLICATIONS

The present invention is related to applications entitled: "SYSTEM AND METHOD OF IN-SERVICE TESTING OF A COMPRESSED DIGITAL BROADCAST VIDEO NETWORK", Ser. No. 09/221,865, filed Dec. 29, 1998 now U.S. Pat. No. 6,297,895 "SYSTEM AND METHOD OF AUTOMATED TESTING OF A COMPRESSED DIGITAL BROADCAST VIDEO NETWORK", Ser. No. 09/221,864, filed Dec. 29, 1994, both applications assigned to the same assignee as that of the present invention and fully incorporated herein by reference.

BACKGROUND OF THE INVENTION (1) Field of the Invention

The present invention relates generally to video data transmission systems, and more particularly to the systems and methods of measuring audio/video synchronization television systems.

(2) Description of the Prior Art

The loss or degradation of audio to video synchronization, or A/V sync, in television systems is a well-known problem. Loss of A/V sync can be attributed to the separate processing and hence delays of the video and audio components of the broadcast. The advancement of television technology has resulted in increased processing of the video to the point where the degree of audio/video skew is highly objectionable to the viewer. In recent years, the application of MPEG-2 compression on the video and audio signals has further exacerbated the problem.

It is standard operating procedure in the broadcast industry to measure A/V sync and apply delays, usually in the audio path, to resynchronize the program audio and video. The A/V sync test involves simultaneously sending an audio and a video test signal and measuring the difference in arrival time. Although the video signal may be concealed from viewers by inserting it within the vertical blanking interval (VBI), the audio test signal cannot be concealed and it is transmitted as part of the audio program material. Because this highly noticeable audio tone interferes with the program material, broadcast engineers are very reluctant to perform A/V sync testing in-service. When faced with an out of A/V sync condition during a live broadcast, engineers will attempt to remedy the situation by adjusting the audio synchronizer while judging audio/video sync by eye. Only as a last resort is an A/V test run in-service.

The introduction of MPEG-2 compression to transmit video over a digital network has worsened the A/V sync problem in two respects. Firstly, the amount of processing performed on the video portion of the broadcast during the encoding process is enormously greater than the audio. Secondly, MPEG-2 encoders do not transmit test signals located in the VBI due to bandwidth considerations. This requires a test engineer to transmit the video sync marker signal within the active viewing area where it may be detected by viewers. So by deploying MPEG-2 compression technology, the engineer is faced with the quandary of an increased need for A/V sync tests and being unable to conceal even the video portion of the test signal.

IBM Video Systems (IVS) operates a high-bandwidth, switched network connecting 6 cities in the continental United States that is used by broadcasters to transmit and receive broadcast video. This service converts a subscriber's analog video to compressed digital format, then routes it to the destination over an asynchronous transfer mode (ATM) switched connection where the digital video is decompressed, converted back into analog and passed on to the receiving end. The analog video is digitized and compressed using MPEG-2 encoding format at a bit rate of 8–40 Mbps. The video is encoded and decoded in real-time and, in many cases, played out directly to air.

The MPEG-2 compression and ATM network, unique to IVS, can cause perturbations that are not normally seen in an analog network. To detect network anomalies and failures real-time, in-service circuit testing is performed so that service may be restored with minimum circuit outage.

Broadcast engineers are a demanding customer set with exacting standards for video quality and availability of service. Since the subscriber's feed is broadcast directly to air via the IVS network, any degradation or interruption of video signal will be obvious to television viewers and may result in a significant loss of revenue to the broadcaster.

Prior art related to A/V synchronization includes: U.S. Pat. No. 5,243,424 issued Sep. 7, 1993, filed May 16, 1991 (Emmit) teaches a method of non-intrusive A/V sync testing by using a tonal audio marking signal that is sufficiently reduced in amplitude to render the tone inaudible however still detectable electronically in order to perform the measurement. The apparatus relies on the existing program material to mask the tone. Instead of injecting a video marker, a technique of waiting for a cut in the video program is taught which causes the audio marker to be injected exactly one second later. The use of a tone as an audio marker mimics the traditional method of A/V sync testing and represents no advantage over prior art. The technique of reducing the audio marker signal strength to an inaudible level has not gained acceptance in the industry because it results in either the audio marker being undetectable or being falsely detected. Furthermore, the psycho-acoustical filter techniques of MPEG-2 audio encoding are specifically designed to mask (i.e., not encode) inaudible side tones present in the audio program which renders this method unsuitable for transmission systems using MPEG-2 compression.

U.S. Pat. No. 5,555,364 issued Jan. 21, 1997, filed Mar. 30, 1995 (Wolf) discloses a device for perception-based, in-service measuring of A/V sync across a transmission system. The device located at the transmitting end extracts features from the video and audio program and time stamps them. The video features are created by detecting inter-frame motion. The device at the destination computes and time stamps the same video and audio features. A separate communication link is used to transfer the origin features and timestamps to the destination site where they are processed along with the destination features and timestamps to determine the end-to-end video and audio delay. The two delays are then subtracted to calculate A/V sync. A disadvantage of the system is that A/V sync cannot be calculated unless motion is present in the video program. Furthermore, the A/V sync measurement does not provide a precise, absolute measurement, but rather a measurement that "is consistent with human perception."

U.S. Pat. No. 5,040,081 issued Aug. 13, 1991, filed Feb. 16, 1989 (McCutchen) discloses a video or film real time synchronization to audio of sequences of images without the need to have a separate reference or carrier. Master/slave control is accomplished via a variable speed SMPTE time code generator.

U.S. Pat. No. RE 33,535 issued Feb. 12, 1991, filed Oct. 23, 1989 (Cooper) teaches a method of synchronizing audio and video by encoding the audio onto the video prior to transmission. On the receive end, the embedded audio is removed from the video signal and the proper delay is inserted.

U.S. Pat. No. 4,963,967 issued Oct. 16, 1990, filed Mar. 10, 1989 (Orland) discloses an out-of-service A/V sync test using a video pulse and an audio tone that is displayed on an oscilloscope. A synchronizer delays the audio unit markers until they coincide.

U.S. Pat. No. 4,313,135 issued Jan. 26, 1982, filed Jul. 28, 1980 (Cooper) teaches a method of preserving A/V sync by using an audio synchronizer to detect delay and adjust it using a variable frequency clock. The video color framing field is used to time video.

U.S. Pat. No. 5,572,261 issued Nov. 5, 1996, filed Jun. 7, 1995 (Cooper) teaches A/V sync measurement by inspection of the opening an closing of the mouth of the speaker and comparing that opening and closing to the utterance of sounds associated therewith.

None of the prior art discloses or suggests a non-intrusive, non-service affecting audio/video synchronization test for which a clear need exists in the industry.

SUMMARY OF THE INVENTION

An object of the invention is an in-service apparatus and method of non-intrusively measuring audio/video synchronization of a television broadcast across an analog, digital, or compressed digital transmission channel.

Another object is to measure A/V sync without using traditional audio marker tones.

These objects and other objects, features and advantages are accomplished in a network providing high bandwidth, broadcast quality video and audio signals. In one embodiment, the analog and video signals are digitized and compressed. The compressed digitized A/V signal is transmitted via an ATM network to a distant end where the signal is converted back into analog or digital format and passed on to the subscriber. The network includes an A/V synchronous test signal generator which injects video and audio markers into the video and audio non-intrusively and routes the two signals into a switch where they are switched into a channel for encoding and transmission via the ATM network. At the distant end the signal is decoded and routed by a switch into the A/V test generator set where the markers are detected and the A/V skew calculated, after which the audio and video are routed to the subscriber. The A/V test set signal generator includes a Video Blanking Interval (VBI) test signal generator and a white noise generator, the former injecting. a marker into the video signal and the later injecting an audio marker into the audio signal. The video marker is injected into the VBI and broadband, background audio noise to measure the delay between the audio and video components of a broadcast. The video marker is a single line of white injected into VBI for a duration of video one frame or 33 milliseconds. The marking of the audio is accomplished by gradually injecting white noise into the audio channel until the noise level is 6 dB above the noise floor of the audio receiver. The white noise is effectively masked by the audio program. When a period of quiet occurs in the audio program, the injected white noise is removed for a period of 1 frame which is detected by the measurement test set as the audio marker. The injected white noise is then slowly attenuated, then removed to escape notice by the viewer/listener. So that the measurement test set at the distant end may unambiguously recognize the injected white noise as the precursory A/V sync signal, a small spectrum of the white noise is notched or removed. This signature and its removal for precisely 1 frame time precludes inadvertent recognition of program audio noise as the audio marker. The noise floor of a broadcast quality audio decoder or the receiver is typically very low, in the range of −58 to −70 dBu, which is inaudible on a consumer television set at normal listening levels. Even if the addition of 6 dB of white noise were to cross the threshold of audibility, it is not perceived by the listener because it is not abruptly added or removed and it cannot be heard over the audio program. Removal of the white noise for a period of 1 frame is psycho-acoustically inaudible to the human ear in normal listening environments. Periods of black video and audio quiet are inserted between program segments and interstitial (e.g., commercials, promotions, public service announcements). This audio quiet or "audio black" is actually the absence of audio program which causes the television audio level to fall to the noise floor level of the audio decoder or receiver in the transmission channel. It is during these brief periods of audio black that A/V synchronization may be imperceptibly tested.

As a further improvement, an A/V sync may also be tested in situations where interstitial are infrequent by testing during periods of quiet during the audio program. Each audio program has its own noise floor that is somewhat higher than the audio decoder noise floor. The audio program noise floor is often established by the ambient noise picked up by the microphones in a broadcast studio or stage setting when no one is talking and there is no other background noise such soft music. To facilitate the testing of A/V sync during periods audio program quiet, the A/V test signal generator monitors the audio program to establish a noise floor and measures A/V sync by injecting white noise 6 dB above this noise floor. A maximum noise floor may be specified to prevent the injected noise from rising to a clearly obvious and objectionable level.

BRIEF DESCRIPTION OF THE DRAWINGS

The invention will be further understood from the following description of a preferred embodiment taken in conjunction an appended drawing, in which.

DESCRIPTION OF PREFERRED EMBODIMENT

Figure 1:
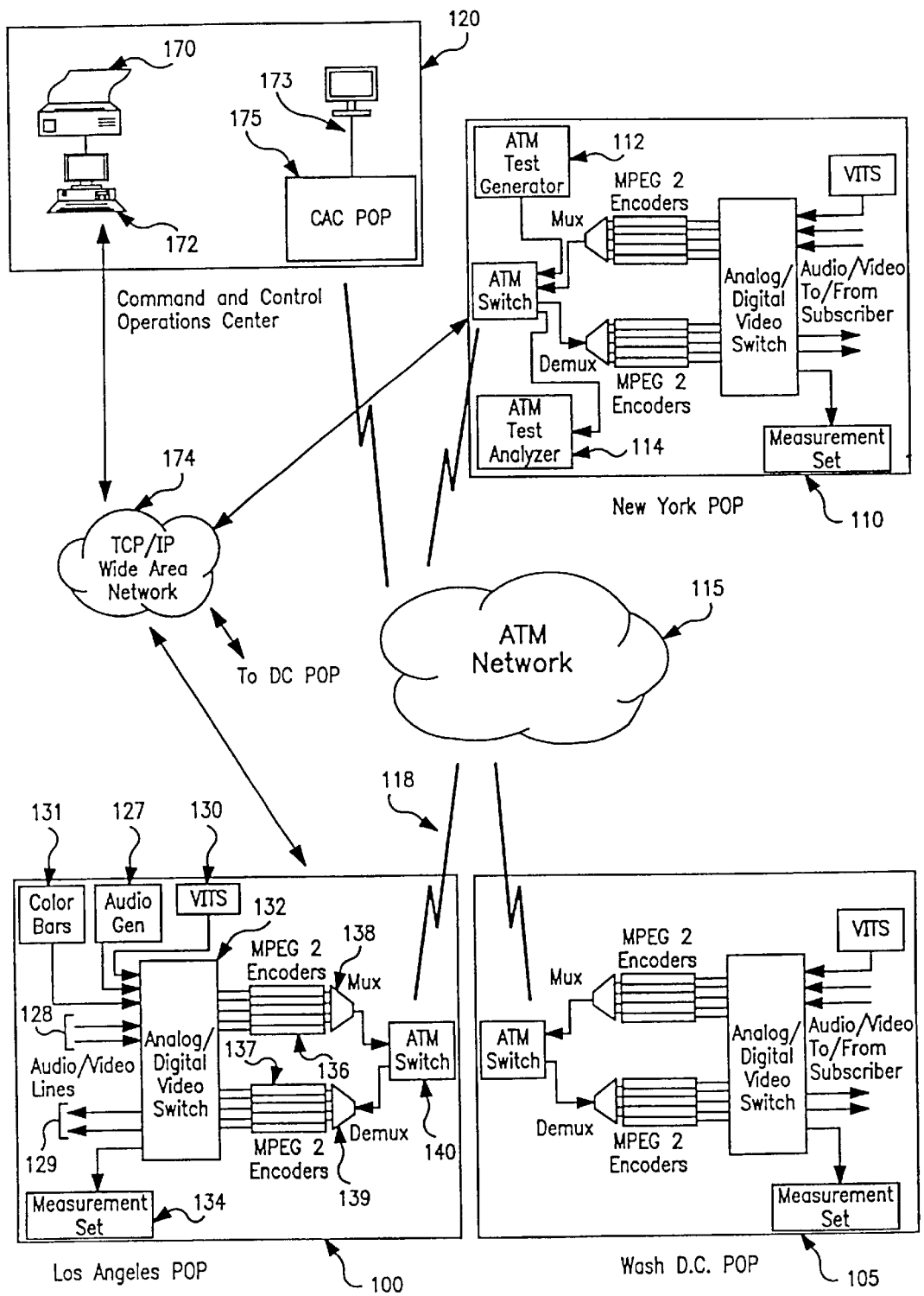
FIG. 1 is a simplified network diagram illustrating 3 sites or points-of-presence (POP) in the IBM Video Services network controlled by a command and control center., and a configuration of a POP.

With reference to FIG. 1, there are illustrated 3 points-of-presence (POP) or gateways into the IBM Video Service (IVS) Network, New York 110, Los Angeles 100 and Washington DC 105. The IVS network provides long distance services for high bandwidth, broadcast quality video and audio by digitizing and compressing the analog/digital video signal and transmitting it to the distant end via a switched asynchronous transfer mode (ATM) network where it is converted back to analog or digital format and passed on to the subscriber.

The 3 POPs are connected to an ATM network 115 through OC-3 (155 Mbps) access lines 118 from an ATM switch 140. Each POP has a set of ingress/egress access lines that carry the video signal to 129 and from 128 nearby subscriber locations. The POP accepts video in either analog or digital (ITU-R601 General Digital Video and SMPTE 259M 270 Mbps Serial) form. The access lines are connected to an analog/digital switch 132 that allows the signals to be switched into dedicated MPEG-2 encoders 136 and decoders 137. The POP interfaces with the ATM network via an ATM switch 140. On the transmit side, ATM switch is connected to a mux 138 which multiplexes the output of the MPEG-2 encoders into a single OC-3 transport stream. Network data that is addressed to the POP is routed into the demux 139 that demultiplexes the OC-3 data into individual MPEG-2 transport streams. The output access lines 129 provide the signal to the subscriber. FIG. 1 is offered only as a representation of a POP configuration. Traffic load dictates the full complement of networking resources.

To test video quality of each newly established video circuit, a vertical interval test signal (VITS) generator 130, an audio signal generator 127 and a video/audio measurement set 134 are wired into the analog/digital switch 132. A color bars generator 131 is also connected to a switch port in order to inject the color bar test pattern into all outbound (egress) lines. This assures the subscriber that there is continuity with the POP. The testing of the ATM switch and ATM trunks necessitates an ATM test generator 112 and an ATM test analyzer 114. These test sets characterize the performance of the ATM switch and network.

Because the POPs are unmanned, they are remotely controlled from a Command and Control (CAC) Operations Center 120 located in New York. Video connections are established and broken by commands issued under program control of network operations software executing in computers 172. These computers maintain continuous connections to each POP over a TCP/IP wide area network 174 to both control the POP equipment and monitor for alarm conditions. The CAC itself contains a small POP 175 since it accesses the ATM network in order to monitor video feeds 173 for quality assurance.

Figure 2:
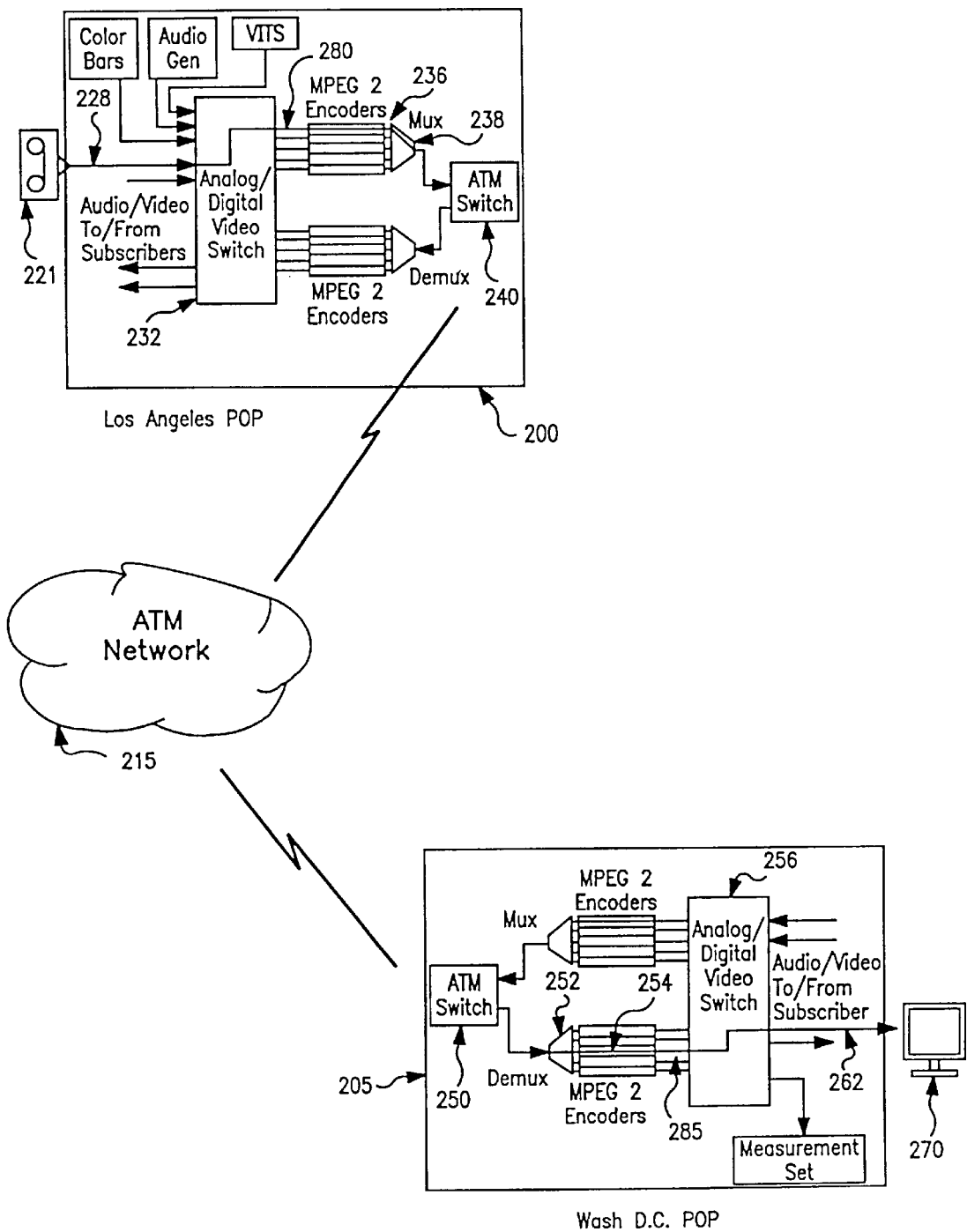
FIG. 2 depicts the connection path of a video circuit originating in Los Angeles and terminating in Washington DC.

FIG. 2 depicts a point-to-point video connection from a subscriber in Los Angeles 200 to Washington DC 205. The video is sourced from a analog video from a video tape recorder 221 and received on the subscriber's private ingress line 228. The signal 280 is switched by the analog/digital switch 232 into the first available MPEG-2 encoder 236. The signal continues on into the mux 238 where it is given an ATM address that permits it to be properly routed by the ATM switch 240 and network 215. At the receiving POP, Washington DC 205, the demux 252 demultiplexes the aggregate OC-3 signal received from the ATM switch 250 and routes the demultiplexed MPEG-2 transport stream 285 into its dedicated MPEG-2 decoder 254. The baseband video output of the MPEG-2 decoder is passed to the analog/digital switch 256 which switches the signal into the customer's private egress line 262 for viewing on a video monitor 270.

Figure 3:
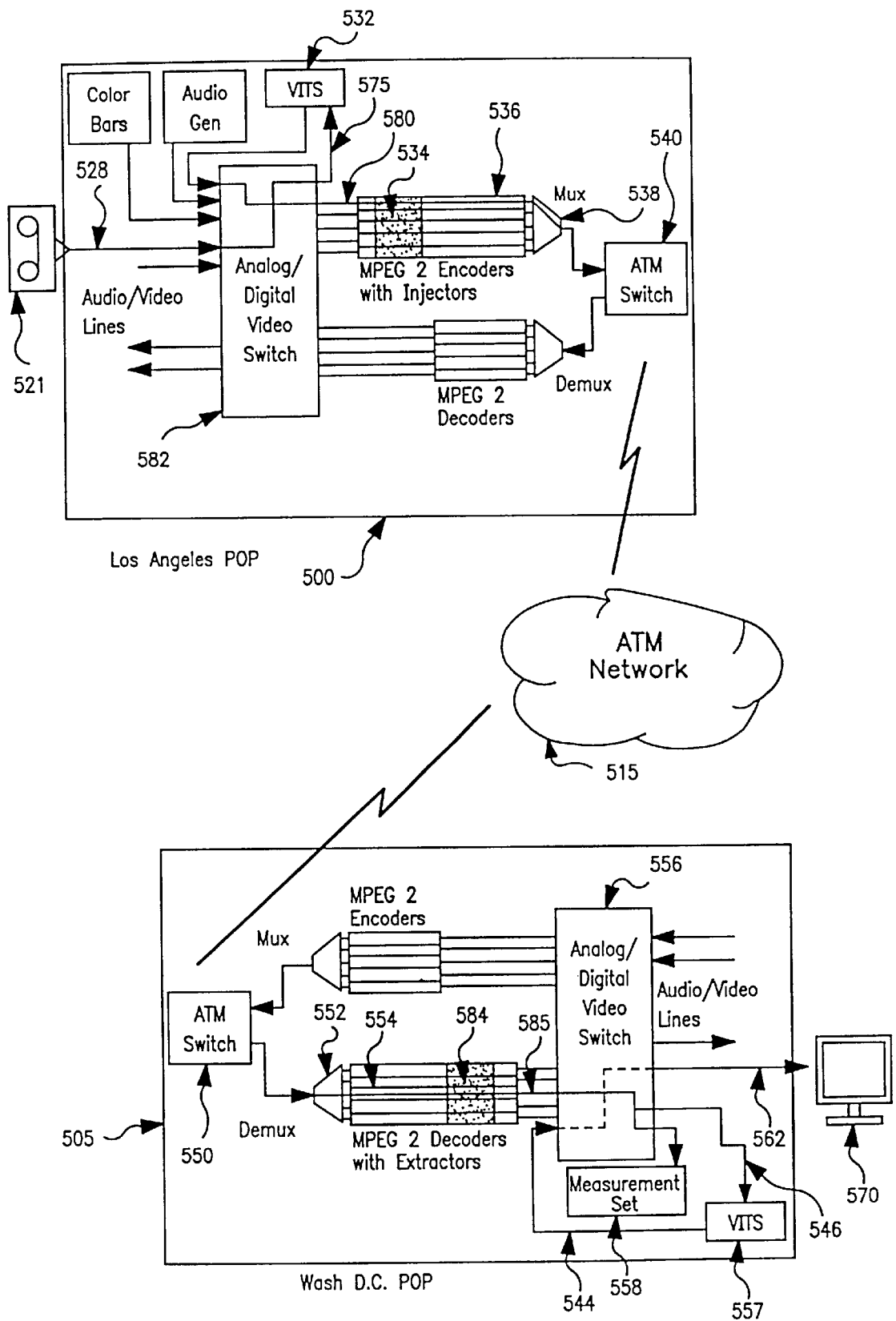
FIG. 3 is an illustration of an in-of-service video test.

With reference to FIG. 3, the technique of VBI in-service testing is illustrated. The VBI of the video signal received from the subscriber may contain signals inserted by the subscriber so an unused or black VBI must be chosen for in-service testing in order not to interfere with the subscriber's VBI data. An idle VBI line is found by searching VBI lines 10 through 20 using the measurement test set 558 to analyze the line. When an idle line is found, the VITS on the transmit side 532 is configured to insert the in-service test signal on that line, the downstream VITS 557 is configured to insert black on the same line, and the measurement set 558 is configured with the VBI line ID and the test signal type. Both VITS are then activated to insert the test signal and black concealment line for the requested duration of time.

At the origin POP 500, the subscriber's video feed 528 is routed through the analog/digital video switch 582 into the vertical interval test signal (VITS) equipment 532 which inserts a test signal into the chosen VBI line without affecting the active video. The analog/digital switch then routes the output of the VITS into the MPEG-2 encoder 536 for encoding and transmission. The injector 534 moves the test signal from the VBI into the active video area before the video is encoded. At the receive end 505, the extractor 584 moves the test signal from the active area into the VBI and the decoded signal 585 is routed into two output ports by the analog/digital switch 556. One port is connected to a VITS and the other to the measurement set 558 that performs analysis and measurement of the video test signals. The VITS 557 receives the video signal 546 and inserts black into the line that contains the in-service test signal, effectively removing the test signal from the broadcast. The video is then routed back into the analog/digital switch 556 where is it switched into the subscriber's egress line 562. In this manner, the IVS network is tested end-to-end affecting neither the viewed broadcast nor the subscriber's VBI signals or data.

Although the preferred embodiment is illustrated in a compressed digital video network, it will be seen that the present invention is incorporated into a test generator and test measurement set that is wholly separate from the video transmission channel. Preferably, the invention would provide both analog and digital interfaces to facilitate testing of either analog or digital transmission systems.

Figure 4A:
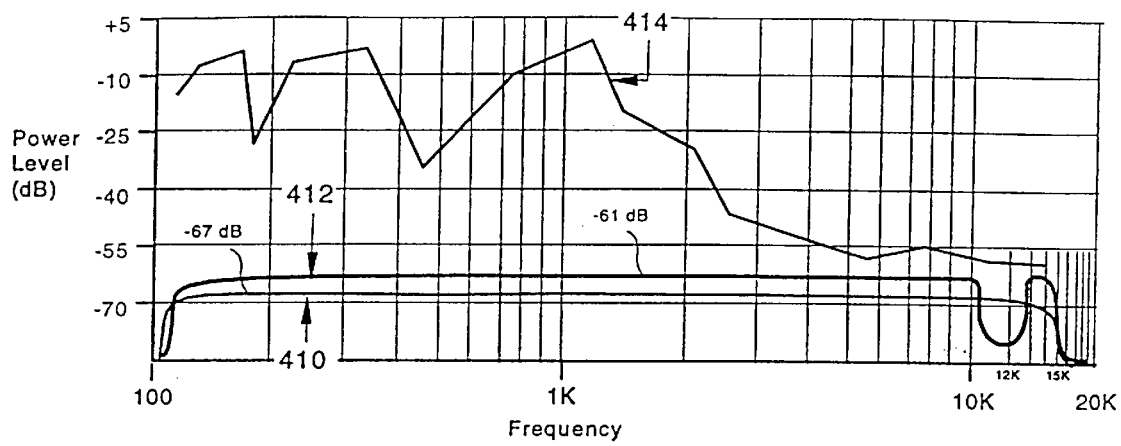
FIG. 4A is an illustration of the signature white noise, program audio and audio decoder noise floor.

FIG. 4A illustrates the frequency spectrum of the audio channel with representative power curves plotted for the audio program 414, the noise floor of the MPEG-2 audio decoder 410 and the signature white noise 412 injected by the A/V sync test generator. The signature white noise test signal is notched at frequencies of 11 kHz through 13 kHz to give the injected noise a distinct and unambiguous signature so that the test measurement set can differentiate the test signal from program audio and background noise. The signature white noise is injected at a RMS power level that is 6 dB higher than the audio decoder noise floor 410 so that the measurement test set can clearly detect its abrupt removal and restoration as the audio marker. The noise power is sampled and measured by subdividing the audio channel into 7 sub bands of 2 kHz ranging from 1 to 15 kHz. Although a 11–13 kHz notch is illustrated, the frequency and bandwidth of the notch would preferably be set to optimize detection and, reduce the audibility of the injected noise.

Figure 4B:
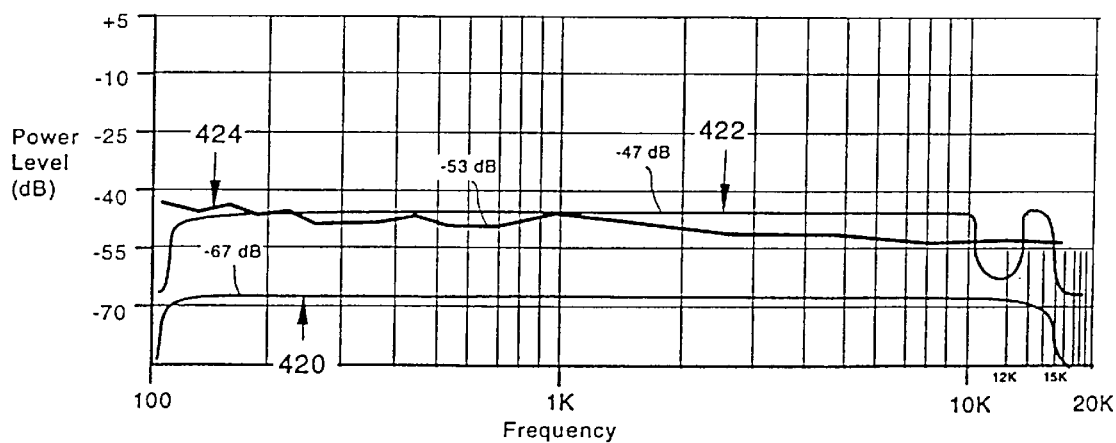
FIG. 4B is an illustration of the signature white noise injected over the program audio noise floor.

FIG. 4B depicts A/V sync test injecting the signature test noise 422 above the program audio noise floor 424 instead of the audio decoder noise floor 420. While probably seldom needed, this mode of testing permits A/V sync measurement during long periods of uninterrupted program audio with the attendant risk of listener discernment. The ambient program audio noise floor is determined by the test generator which continuously monitors the audio channel for short periods of stable audio quiet to measure an average noise power level. The test generator will never inject a noise test signal greater than a user defined limit which is deemed to be a threshold of audibility on a consumer grade television receiver. The limit defined herein is −45 dBu.

Although the level of injected noise, 6 dB above the noise floor, is inaudible at normal listening levels, the injected test noise is further masked by ramping up the noise of a period of 15 frames. The noise is removed over a period of 60 frames unless the audio program resumes its normal level first, in which case the test noise can be abruptly removed without alerting the listener. Only one channel of audio is utilized to transmit the audio marker, however the noise can be injected into the left, right or any combination of available audio channels as an additional masking technique.

A/V Sync Test Signal Generator Operation

Figure 5:
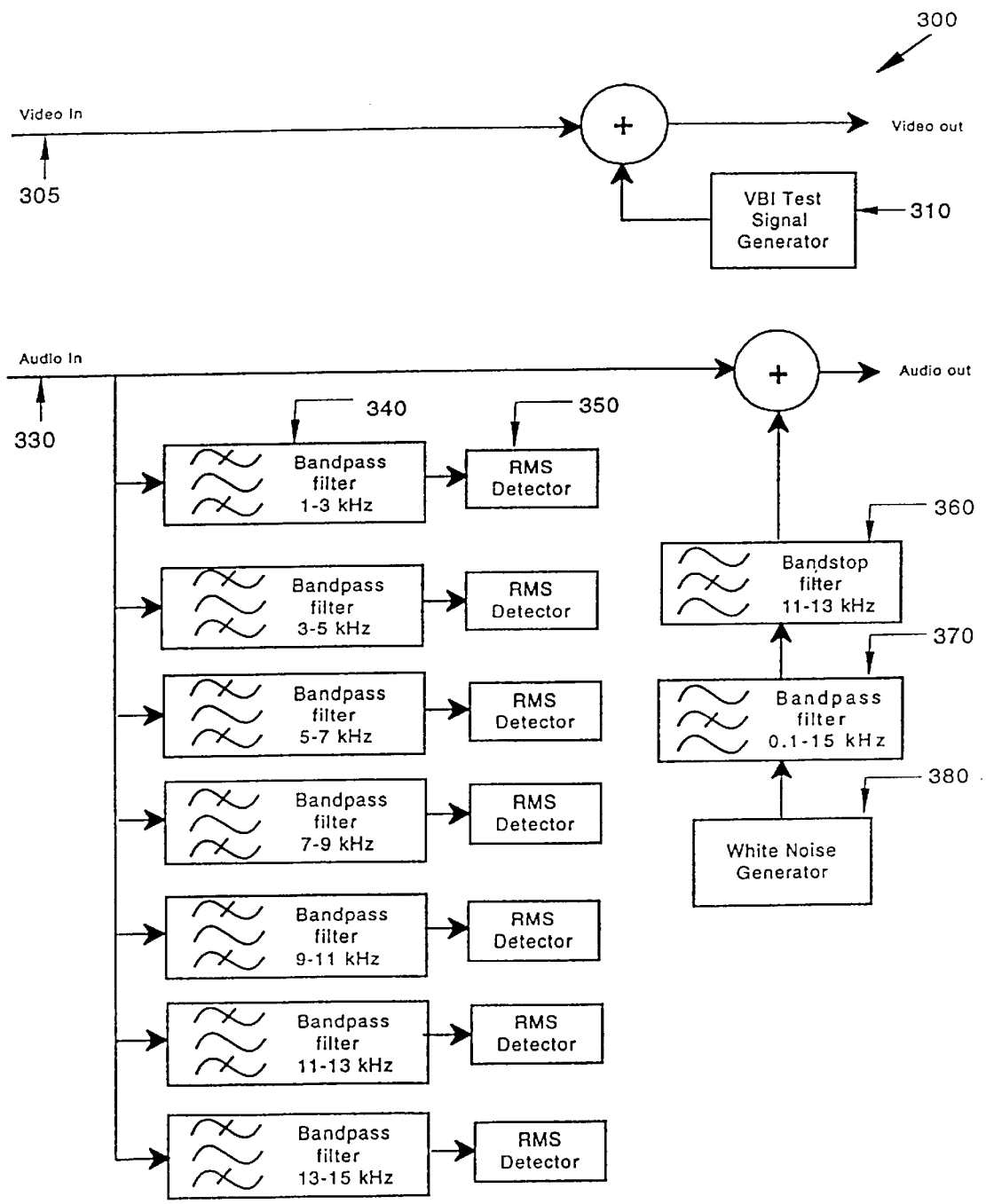
FIG. 5 is an illustration of an A/V test generation set incorporating the principles of the present invention included in the network of FIG. 1.

FIG. 5, illustrates the block diagram of the A/V sync test signal generator 300. A VBI test signal generator 310 injects a single line of white into the normally black VBI for a period of one frame to form the video marker. This test signal is added into the video signal 305 to be transmitted. The audio marker is injected into the program audio 330 by the white noise generator 380 whose output is shaped into the signature noise spectrum by a bandpass filter 370 which limits the noise to the bandpass of the audio channel and a bandstop filter 360 which gives the signal its signature notch. A set of bandpass filters 340 and RMS detectors 350 are used to monitor the program audio levels to detect periods of audio black and measure the ambient noise floor of the audio program.

Figure 6:
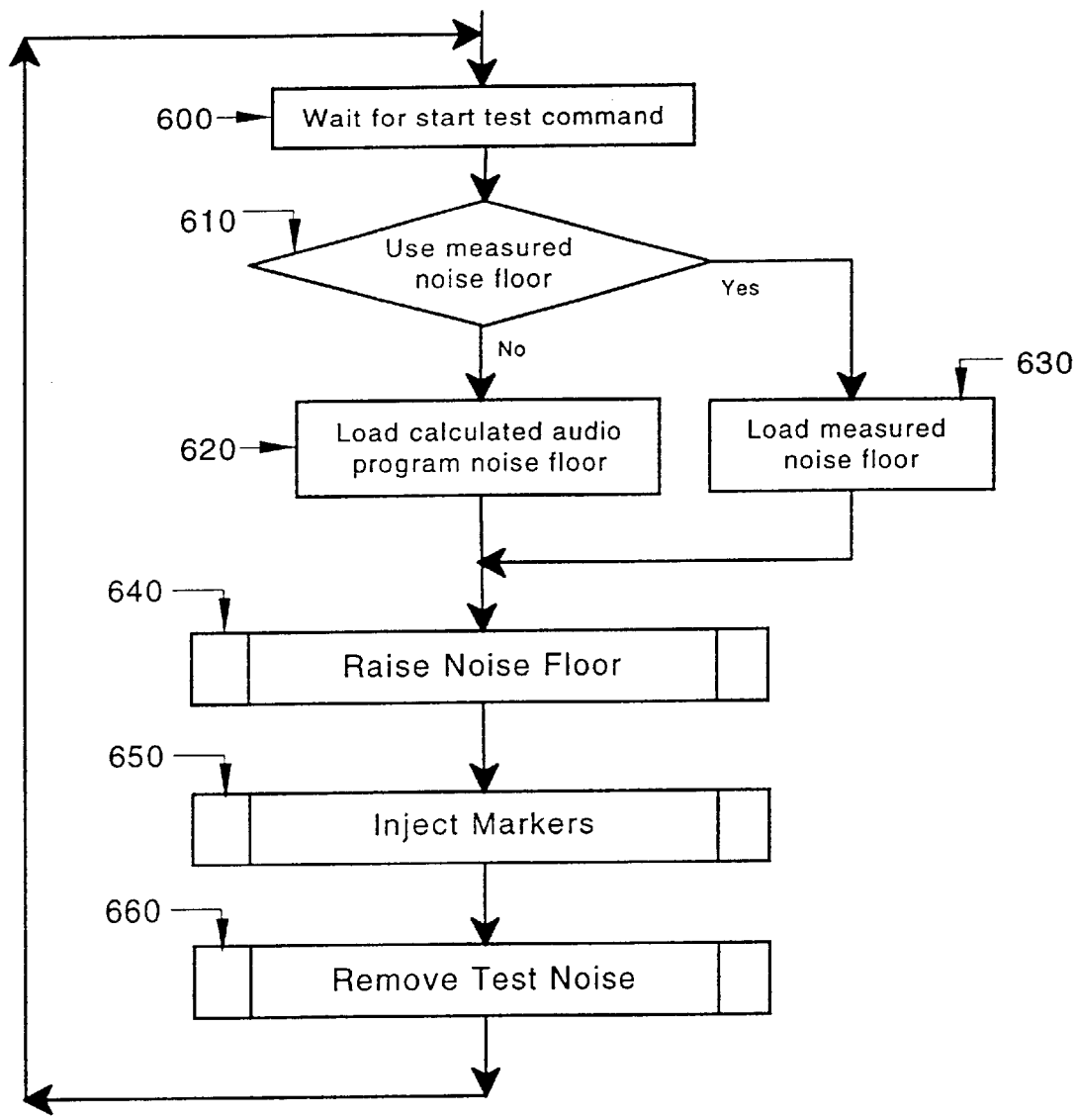
FIG. 6 is a logic flow diagram of the test generator set of FIG. 5.

The Test Generator logic is illustrated in FIG. 6. The test generator is idle 600 waiting for a test start signal that can be received either locally or remotely over a communications line. Once commanded to start, the test begins by determining whether the test is to be performed using the measured decoder noise floor or the ambient audio program noise floor 610. The measured decoder noise floor parameter, provided by a test engineer or remotely loaded by a test executive, is extracted from a database containing the measured noise floor of each configured audio decoder. A "no" condition results in the ambient noise floor of the audio program being loaded 620, otherwise the specified noise floor is used 630. In preparation for the test, step 640 calls the Raise Noise Floor routine to artificially raise the noise floor 6 dB by injecting the signature test noise.

Figure 7A:
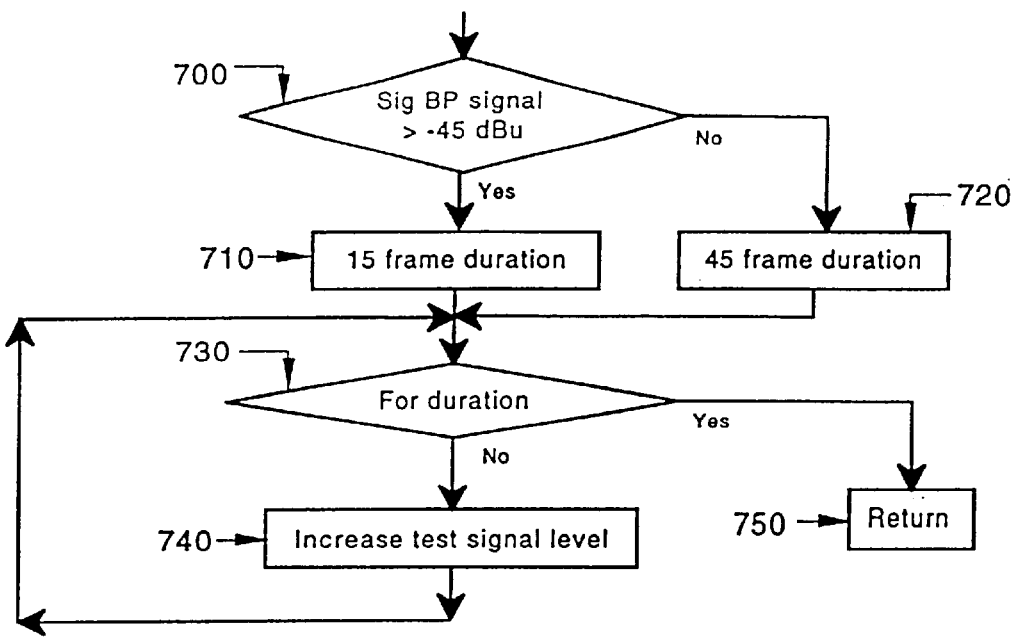
FIG. 7A is a logic flow diagram for raising an audio noise floor in the test generator set of FIG. 5.

In the Raise Noise Floor routine, FIG. 7A, step 700 tests if the audio program signal strength is greater than −45 dBu. A "yes" condition results in the setting of a 15 frame time period 710 over which to gradually increase the signature noise test signal to 6 dB over the measured or program audio noise floor. The lack of an audio program, a "no" condition, causes a 45 frame duration to be used 720. A loop is then entered 730–740 where the strength of the test signal is gradually increased 740. At the expiration of the time period, a "no" condition occurs in step 730 and the routine returns 750 to the caller.

Figure 8:
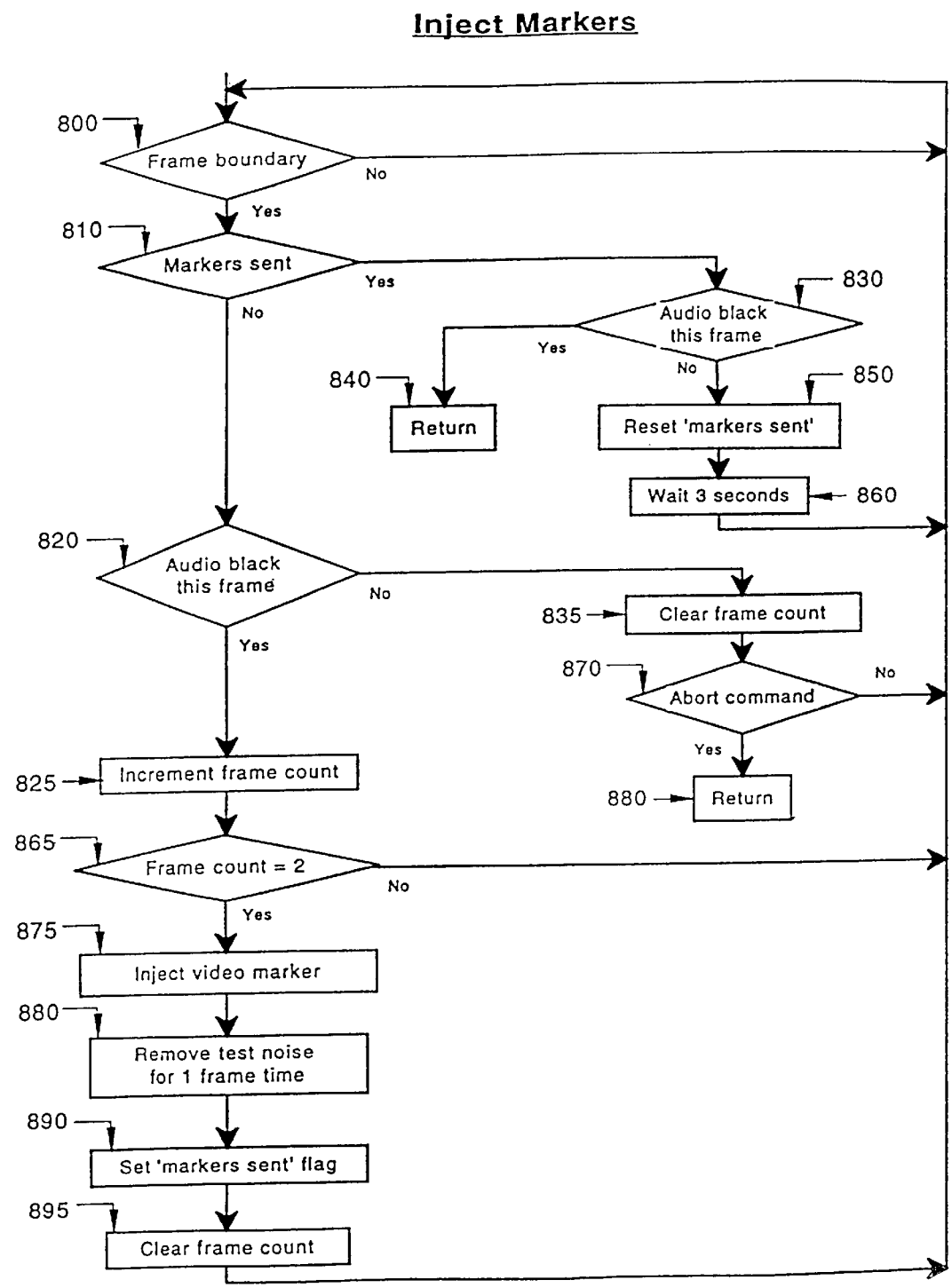
FIG. 8 is a logic flow diagram for injecting the audio and video test markers in an audio/video signals in the network of FIG. 1.

After artificially raising the noise floor, the Inject Markers routine is called 650 to perform the actual test. Referring now to FIG. 8, the routine first synchronizes with the frame boundaries in step 800. On each frame boundary, a "yes" condition, the "markers sent" global flag is tested to determine if the markers were transmitted on the previous frame. A "no" condition signifies the markers were not sent and the logic continues to step 820 were a test is performed to see if the current frame is audio black. A "no" result causes the frame count to be cleared 835 and a test performed for an abort command from the operator 870. If "yes", the routine returns to the caller 880, else a "no" causes the loop to iterate and wait for the next frame boundary. If the current frame is audio black in test 820, the frame count is incremented 825. If this is the second consecutive audio black frame 865, the video and audio markers are injected 875 880, the "markers sent" flag is set 890, the frame count is cleared 895 and the logic returns to the top of the loop to await the next frame.

Three consecutive frames of audio black are required in order for the measurement test set to discern the audio marker. The test measurement set must see the restoration of the injected signature noise on the next frame in order for the audio marker, seen on the last frame, to be considered valid. On the next frame, the test of the "marker sent" flag 810 results in a "yes" condition and the current frame is tested for audio black 830. If "yes", the audio marker injection is successful and, with both markers successfully transmitted, the routine returns 840. A "no" condition for test 830 indicates interference by the audio program and the markers must be retransmitted. The "marker sent" flag is reset 850 and the test generator waits for 3 seconds 860. This wait period allows the test measurement logic to timeout and rearm the video and audio marker monitors. Following the 3 second wait, the logic restarts the loop 800 to monitor for the next period of audio black.

Figure 7B:
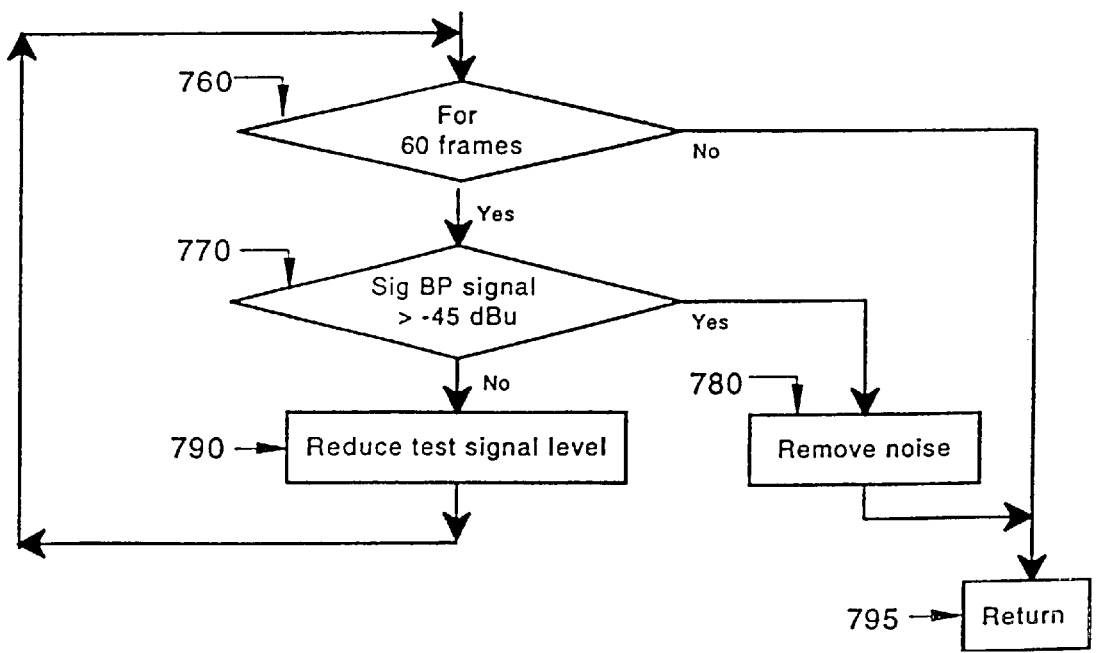
FIG. 7B is a logic flow diagram for removing a signature test noise signal in the test generator set of FIG. 5.

Returning to FIG. 6, the A/V sync test is completed by calling the Remove Test Noise routine 660 and returning to wait for the next start test command 600. FIG. 7B diagrams the Remove Test Noise logic. A loop is entered in operation 760 for a period of 60 frames. On each iteration of the loop, the presence of audio program is tested (i.e. −45 dBu or greater) 770. A "yes" result indicates sufficient audio masking and the signature test noise is removed 780 and the routine returns 795. A "no" condition in step 770 results in a further reduction in the amplitude of the test noise 790 and the loop iterates. At the end of the 45 frame period, "no" condition in step 760 causes the routine to return 795.

Figure 9:
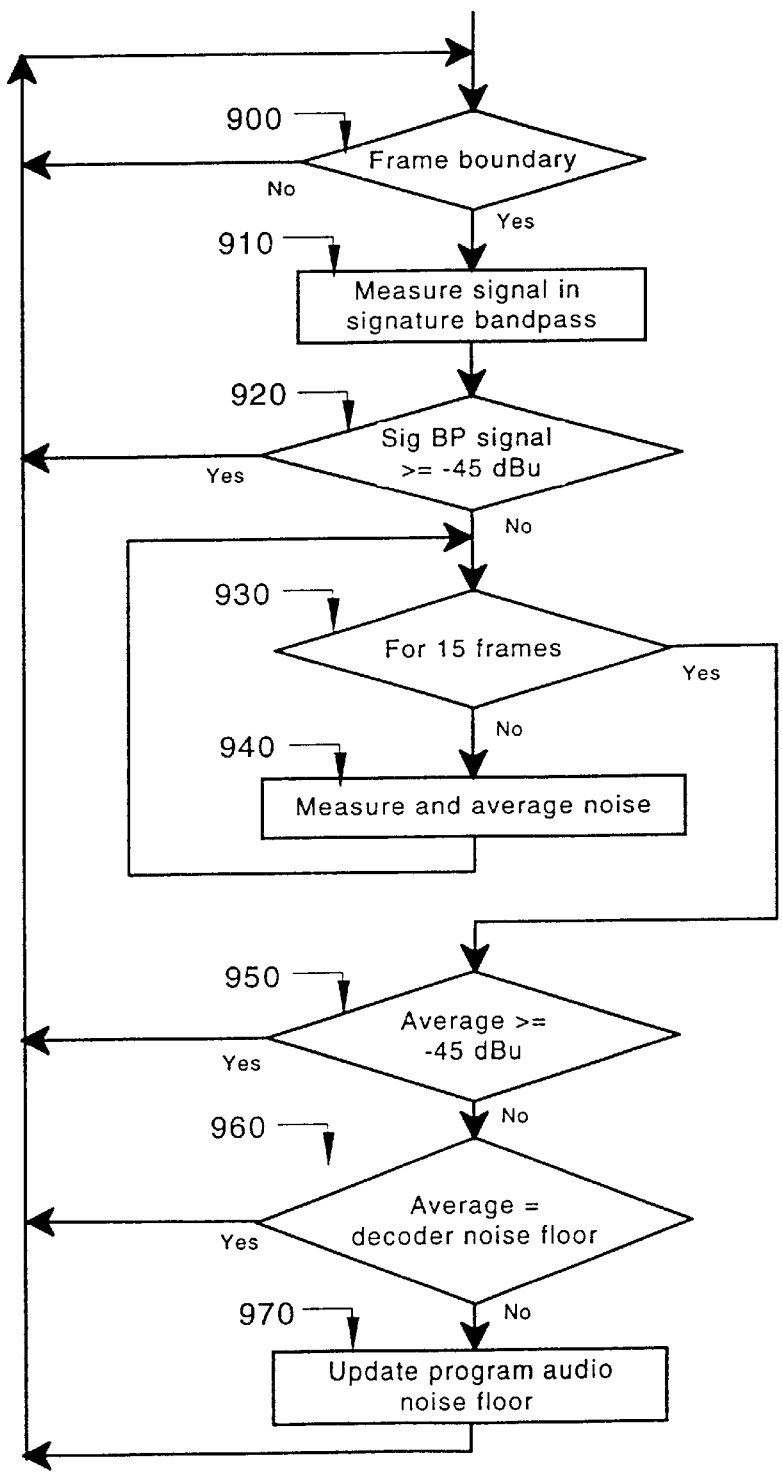
FIG. 9 is a logic flow diagram for measuring an ambient audio program noise floor for the test generation set of FIG. 5.

The logic flow for measuring the ambient noise floor of the program audio is illustrated in FIG. 9. The ambient noise floor is defined as a noise level that is below the level of the program audio content (i.e. −45 dBu) and greater than the noise floor level of the audio decoder when the audio input is terminated. The routine begins by synchronizing with the frame boundary 900 and measuring the level of the audio channel 910. If the audio level is greater or equal to −45 dBu, the channel is transmitting audio content and the ambient noise floor cannot be tested so the loop iterates. A "no" condition puts the logic into a loop 930–940 where for 15 frames the noise is measured and averaged 940. At the end of 15 frames, a "no" condition in step 930, the logic continues on to step 950 to compare the average noise level against the −45 dBu limit. A reading greater than −45 dBu indicates the noise reading was contaminated by program audio content and a "yes" result causes the loop to iterate to perform another noise measurement. If the noise level was less than −45 dBu, another test is made comparing the average noise to the decoder noise floor 960. If equal to the decoder noise floor, the reading is discarded and the loop iterates. Otherwise the average noise measurement is considered valid ambient program audio noise and the audio program noise floor value is updated 970.

A/V Sync Test Signal Measurement Set Operation

Figure 10:
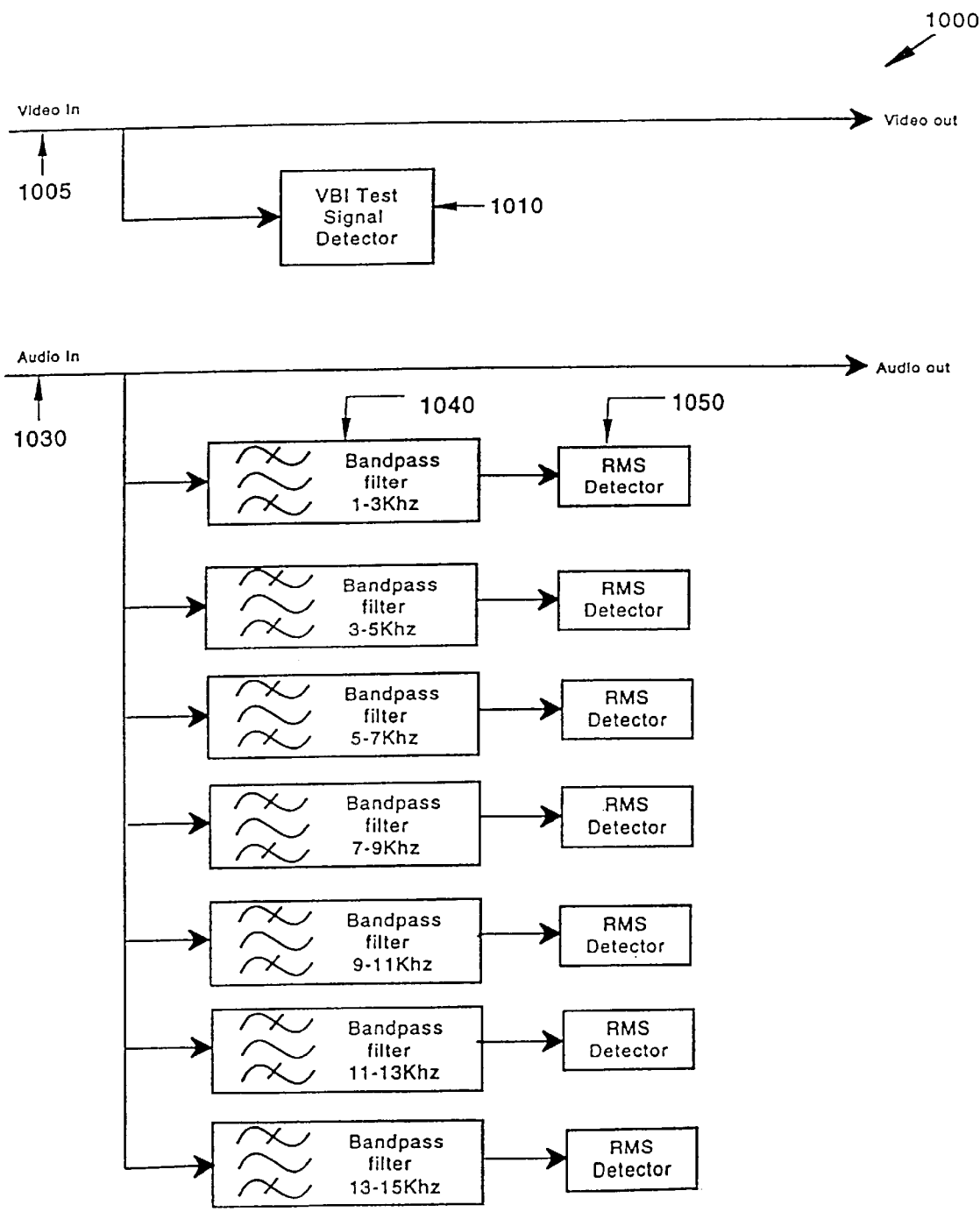
FIG. 10 is a block diagram of the A/V test measurement set of FIG. 5 for purposes of describing the operation of the set.

FIG. 10, illustrates the block diagram of the A/V sync test measurement set 1000. The video in 1005 is monitored by a VBI test signal detector 1010 which detects the characteristic white video line flash that forms the A/V sync video marker. The audio in 1030 is sampled by a series of bandpass filters 1040 which subdivide the audio channel into 7 sub bands. The audio levels of each sub band is measured by a RMS detector 1050 and processed to facilitate the detection of the audio marker.

Figure 11:
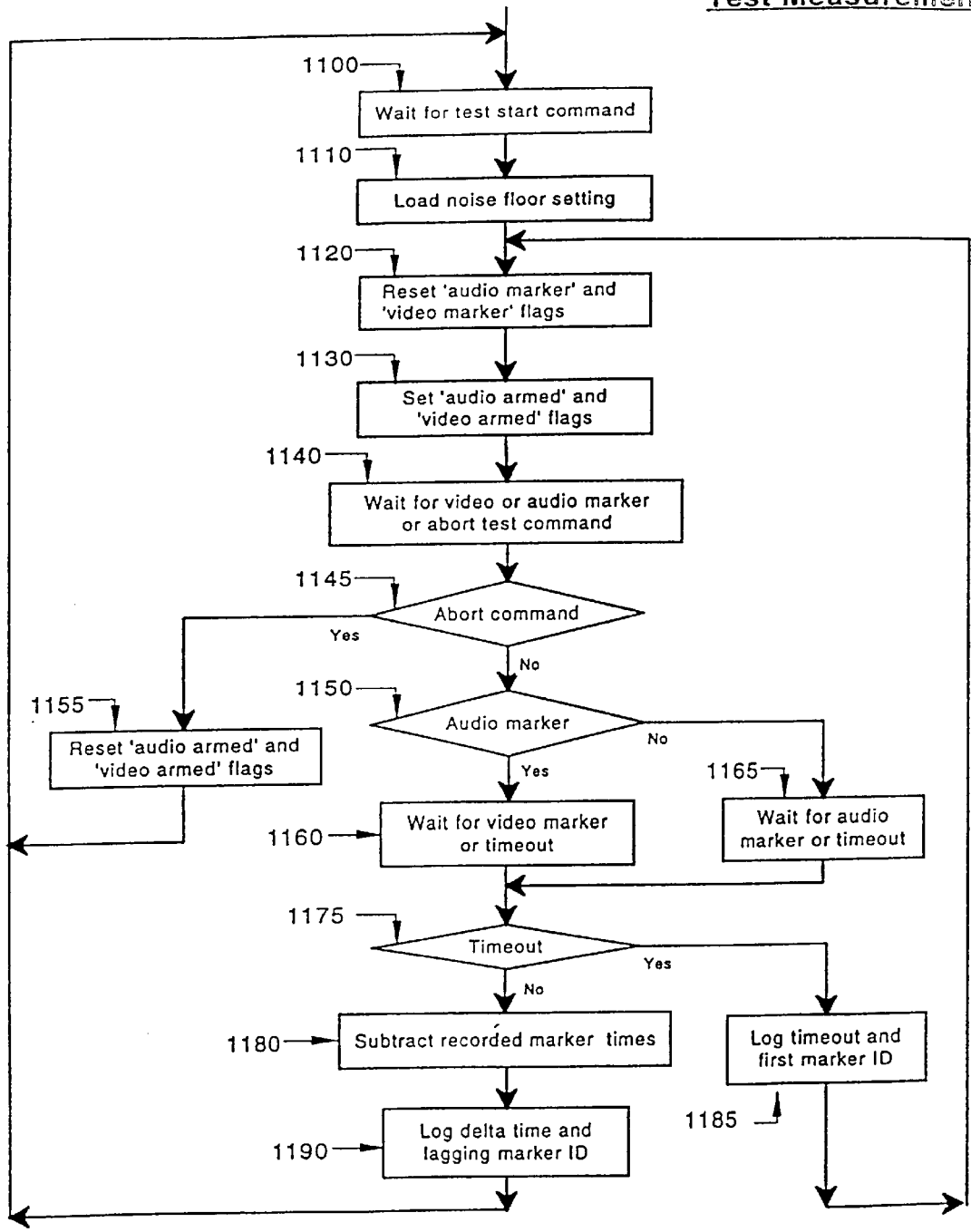
FIG. 11 is a logic flow diagram for the measurement test set main logic for the test measurement set of FIG. 10.

With reference to FIG. 11, the measurement set is idle 1100 waiting for a test start signal that can be received either locally or remotely over a communications line. Once commanded to start, the test begins by loading the noise floor setting parameter 1110. This parameter, provided by the test engineer or remotely loaded by a test executive, is extracted from a database containing the measured noise floor of each configured audio decoder. Two global flags, "audio marker" and "video marker" are reset 1120 and the audio and video marker monitors are enabled by setting the "audio armed" and "video armed" flags 1130. A wait state is then entered 1140 until either marker is detected or a test abort command is received. In step 1145 a test is made to determine if an abort command was received. A "yes" results in the "audio armed" and "video armed" flags being reset to disable the marker monitors 1155 and a return to wait for the next test start command 1100. A "no" results in another test 1150 to determine if the audio marker was received. A "yes" condition falls through to wait for the video marker to arrive or a timeout to occur 1160. A "no" condition indicates the video marker was received and a wait state is entered 1165 which will be satisfied by either the arrival of the audio marker or a timeout. A timer value of 3 seconds ensures the measurement set does not enter a permanent wait state should a marker go undetected. The completion of operations 1160 and 1165 causes a test to be performed to determine if the wait state was satisfied by the arrival of a marker or a timeout 1175. A "yes" condition indicates a timeout and the results of the test are logged along with the ID of the first marker received 1185 and the measurement set reruns the test by returning to operation 1120. A "no" condition in step 1175 results in the A/V sync time being calculated by subtracting the two marker times 1180 and logging the time differential and lagging marker ID 1190. The measurement set then halts 1100 awaiting the next start test command.

Figure 12:
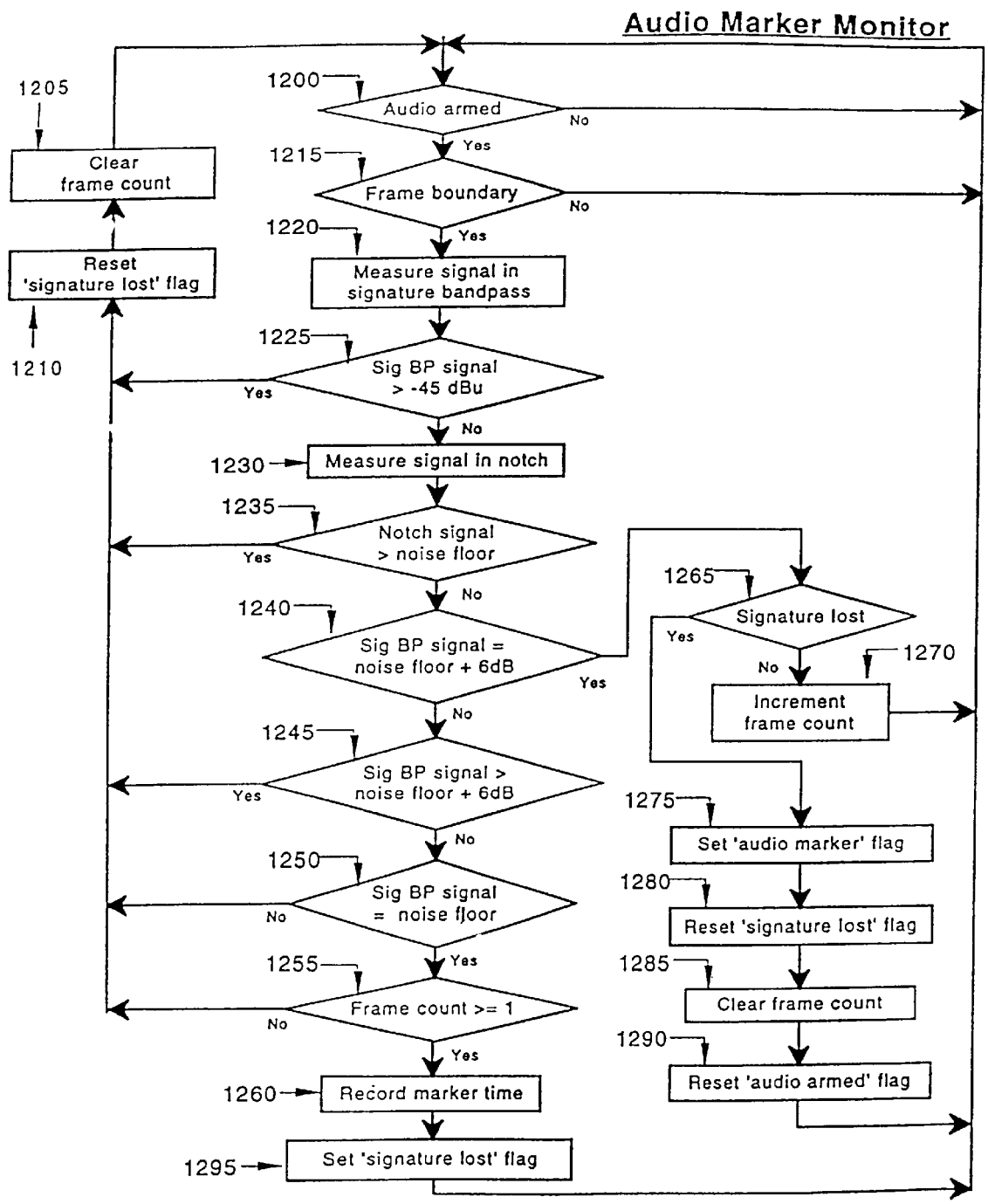
FIG. 12 is a logic flow diagram for monitoring an audio marker in an analog signal in the test measurement set of FIG. 10.

The Audio Marker Monitor logic is illustrated in FIG. 12. The logic flow is confined to a loop 1200 until enabled by the setting of the "audio armed" flag. Once armed, the logic synchronizes with the boundary of each frame to perform the marker detection function. A "yes" condition in step 1215 indicates a frame boundary and the signal is measured in the signature bandpass 1220 which excludes the notched region. If the signal strength is greater than −45 dBu 1225, channel contains audio program and no attempt is made to detect the injected test noise. A "yes" condition causes the "signature lost" flag to be reset 1210, the frame count cleared 1205 and the loop iterates to await the next frame boundary. A "no" condition in step 1225 results in the signal strength within the notched region being measured 1230. If the notch signal is greater than the noise floor 1235, a "yes" condition, the test signal is assumed not to be present and the loop iterates. A "no" advances the logic to step 1240 which compares the noise within the bandpass region for equality with the noise floor level +6 dB. A "yes" indicates the verified presence of the signature noise signal and the "signature lost" flag is tested 1265 to see if the signature noise signal had been removed on the prior frame. A "no" means the audio marker has not yet been received and a frame count is incremented 1270 to track the number of consecutive frames in which the test signal is detected.

Returning to operation 1240, if the bandpass noise is not equal to the noise floor +6 dB, a "no" condition, another test is performed to see if the signal level is greater than the noise floor +6 dB 1245. A "yes" signals the likely presence of low level program audio so processing ends and the loop iterates. A "no" result advances the logic to test if the signature noise signal is equal to the noise floor 1250. If the signal strength within the signature bandpass region is not equal to the noise floor, it implies the test generator is still ramping up the noise and it is not at full strength yet and processing ends for this iteration of the loop. A "yes" result in step 1250 means there is no injected signature noise so the frame count is examined to see if the test signal had been there on the previous frame 1255. A frame count of zero, a "no" condition, implies no test signal is being injected and the loop iterates resetting the "signature lost" flag 1210 and the frame count 1205. A "yes" signals the removal of the test signal on the current frame and it is interpreted as the audio marker signal. The time is recorded 1260 and the "signature lost" flag is set 1295. In order for this audio marker to be valid, the signature noise signal must be restored on the next frame and this flag is used to test this condition. Upon completion of operation 1295, the loop returns to wait for the next frame boundary.

Figure 13:
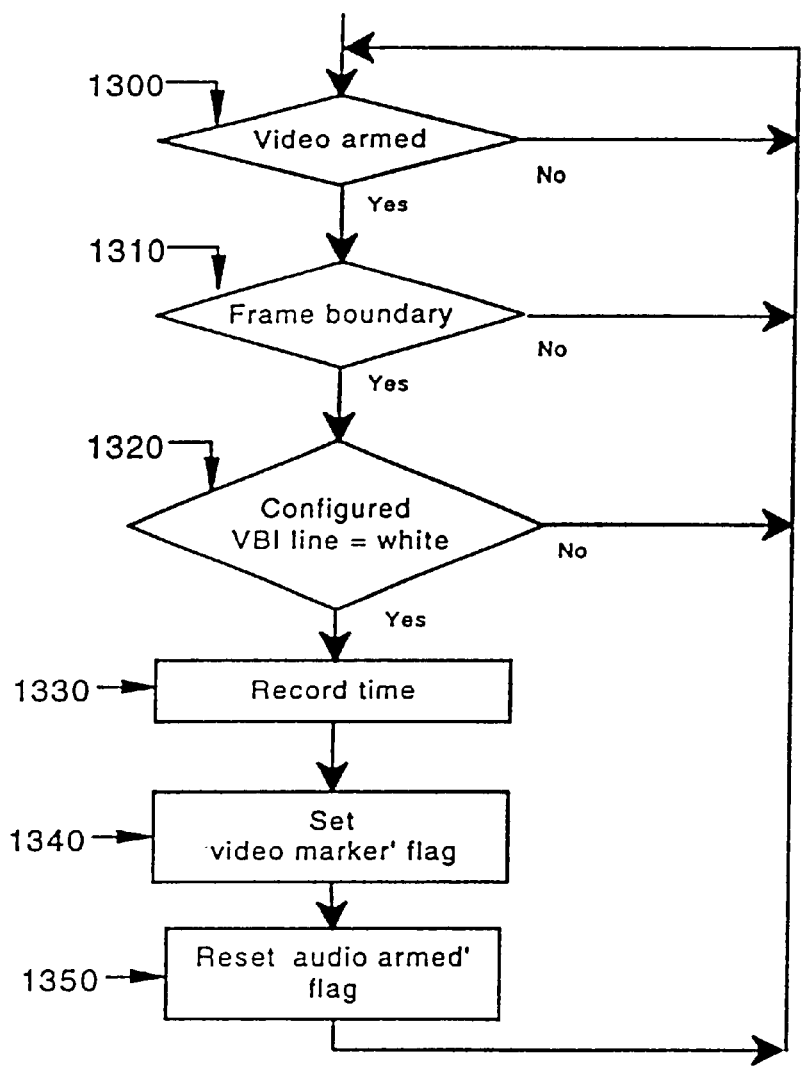
FIG. 13 is a logic flow diagram for monitoring a video marker in a video signal in the test measurement set of FIG. 10.

On the next video frame, if the signal within the signature bandpass is equal to the noise floor +6 dB 1240 and the "signature lost" flag results in a "yes" condition in operation 1265, the "audio marker" flag is set 1275 to trigger the awakening of the measurement set main logic. The "signature lost" flag is reset 1280 and the frame count is cleated 1285 to initialize them for the next test invocation and the "audio armed" flag is reset 1290 to disable the audio marker monitor. The Video Marker Monitor, FIG. 13, contains logic that is enabled by the measurement test set by setting the "video armed" global flag. Synchronizing with the video frame boundaries, a "yes" result in test 1310 results in the VBI test signal detector being queried 1320 to determine if a white marker was received in the configured VBI line. A "no" result causes the loop to return to 1300 to await the next frame boundary. A "yes" condition causes the time of arrival to be recorded 1330 and the "video marker" flag to be set 1340 to signal the main logic. The "video armed" flag is then reset 1350 to disable the video marker monitor.

Figure 14:
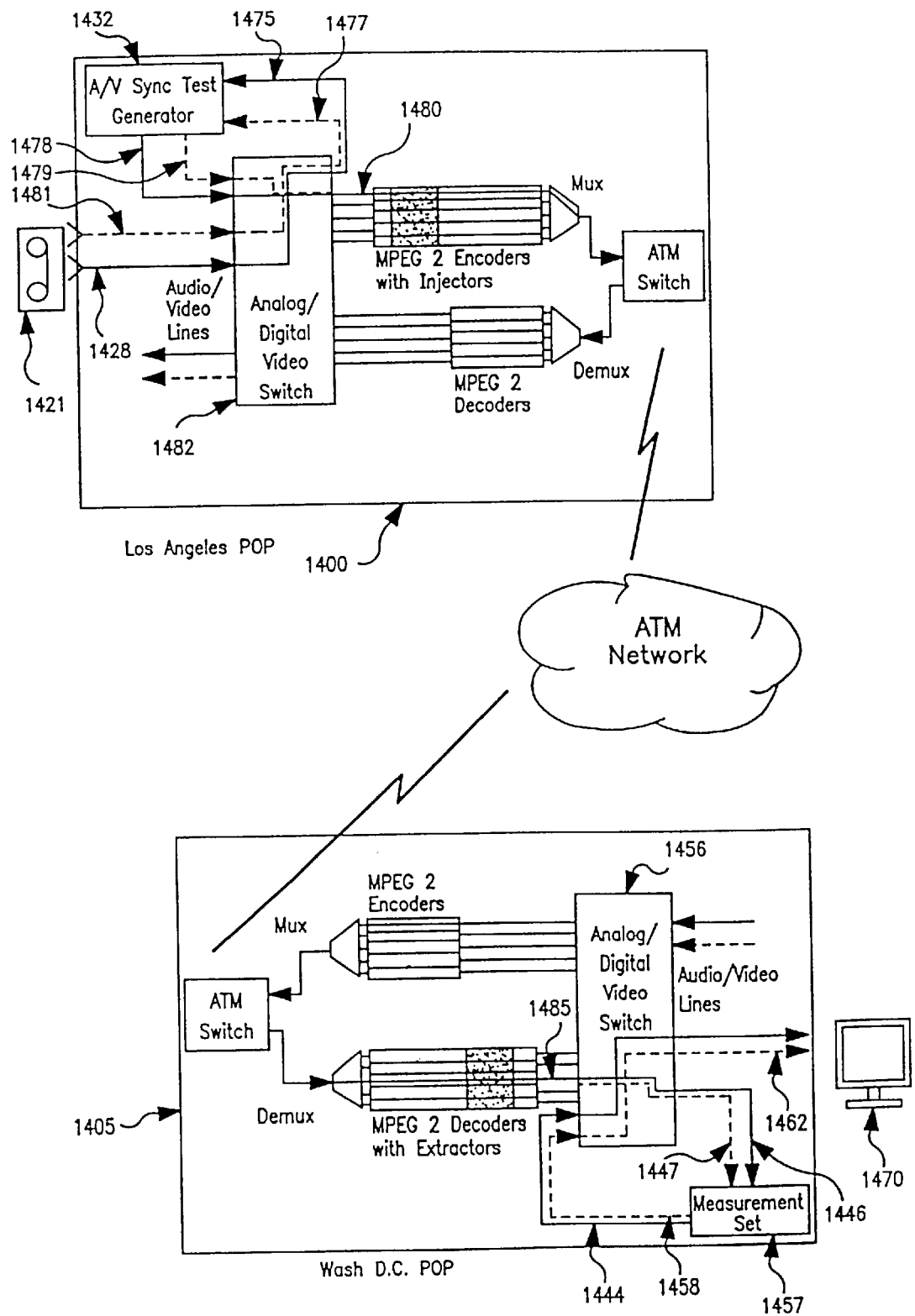
FIG. 14 illustrates the A/V sync test generator and measurement set of FIG. 5 and FIG. 10, respectively in a compressed digital video transmission network of FIG. 1.

With reference to FIG. 14, the preferred embodiment is shown in a compressed digital video network in an in-service test configuration. At the Los Angeles POP 1400, the audio 1481 and video 1428 portions of a video feed are routed by the analog/digital switch 1482 into the A/V sync test generator 1432 by way of lines 1475 and 1477. The test generator in turn injects the video and audio markers into the video/audio unintrusively and routes the two signals 1478 1479 back into the switch where they switched into a channel 1480 for encoding and transmission. At the destination POP 1405, the decoded signal 1485 is routed 1446 1447 by the analog/digital switch 1456 into the measurement test set 1457, where the video and audio markers are detected and the delay skew is calculated. The video and audio are returned 1444 1458 to the switch for routing to the subscriber 1462.

Although a preferred and secondary embodiment have been disclosed, it will be understood by those skilled in the art that changes can be made to these specific embodiments without departing from the sprite and scope of the invention. Furthermore, these embodiments are for the purpose of example and illustration only and-are not to be taken to limit the scope of the invention or narrow the scope of the appended claims.

We claim:

1. In a network providing high bandwidth, broadcast quality video (V) and audio (A), apparatus for measuring the skew between the video and audio signal comprising:

means for transmitting the A/V signal via an ATM network to a distant end;

means including an A/V synchronous test signal generator sender for non-intrusively injecting video and audio markers into the transmitted video and audio signals;

means for routing the audio and video signals into a switch for encoding and transmission via the ATM to the distant end;

means at the distant end for decoding and routing the analog and video signal;

A/V synchronous test signal generator receiver for receiving the analog and video signal and detecting the audio and video markers; and means for calculating the A/V skew from the detected audio and video markers.

2. The apparatus of claim 1 further comprising:

a Video Blanking Interval (VBI) test signal generator and a white noise generator in the A/V test set generation sender, the former injecting a marker into the video signal and the later injecting an audio marker into the audio signal.

3. The apparatus of claim 1 further comprising:

means for injecting into the VBI a single line of white injected into VBI for a duration of one video frame.

4. The apparatus of claim 1 further comprising:

means for gradually injecting white noise into the audio signal until the noise level is a pre-selected amount above a noise floor of the audio receiver;

means for removing the white noise for a period of 1 video frame as the audio marker.

means for slowly attenuating the white noise and removing the attenuated white noise to escape notice by a viewer/listener.

5. The apparatus of claim 4 further comprising:

means for notching a small spectrum of the white noise so that the measurement test set at may unambiguously recognize the injected white noise as a precursor A/V sync signal.

6. The apparatus of claim 1 further comprising:

means for testing A/V synchronization during brief periods of audio black wherein the audio black duration is of at least 3 consecutive video frames in either NTSC and PAL formats respectively.

7. The apparatus of claim 1 further comprising:

means for monitoring an audio program to establish a noise floor and measuring an A/V sync by injecting white noise 6 dB above the noise floor.

8. The apparatus of claim 7 wherein the means for monitoring and measuring is an A/V test signal generator.

9. The apparatus of claim 7 wherein a maximum noise floor is specified to prevent injected noise from rising to an objectionable level.

10. The apparatus of claim 1 wherein the input video and audio signals are digitized.

11. The apparatus of claim 1 wherein the input video and analog signals are analog.

12. In a network providing high bandwidth, broadcast quality video (V) and audio(A) including an A/V synchronous test signal generator sender and an A/V synchronous test signal generator receiver, a method for non-intrusively measuring the skew between the video and audio (A/V) signal without using traditional audio marker tones, comprising the steps of:

transmitting the A/V signal via an ATM network to a distant end;

non-intrusively injecting video and audio markers into the transmitted video and audio signals means using an A/V synchronous test signal generator sender;

routing the audio and video signals into a switch for encoding and transmission via the ATM to the distant end;

decoding and routing the analog and video signal at the distant end;

receiving the analog and video signal and detecting the audio and video markers using an A/V synchronous test signal generator receiver; and calculating the A/V skew from the detected audio and video markers.

13. The method of claim 12 further using the test signal generator comprising the steps of:

determining and selecting the noise floor for conducting an A/V skew test;

loading the selected noise floor into the test signal generator set;

raising the noise floor;

injecting markers into the A/V signal; and removing the test noise.

14. The method of claim 12 further injecting test markers into the A/V signal, comprising the steps of:

synchronizing an A/V frame boundary with the test set generator;

determining if markers were sent on the previous frame, a "no" condition advances the program to the next step; a "yes" condition determines if the frame is audio black whereupon a video and an audio marker are injected into the A/V signal, a "no" condition resetting the marker sent flag;

determining if the current frame is audio black;

incrementing frame count if the audio frame is black, else the frame count is cleared and a test performed to abort or return to start;

injecting a video marker and audio marker into the frame;

setting the marker sent flag; and clearing the frame count.

\* \* \* \* \*